(12) United States Patent
Dong et al.

(10) Patent No.: US 12,110,394 B2
(45) Date of Patent: Oct. 8, 2024

(54) AQUEOUS POLYMER DISPERSION AND PROCESS OF MAKING THE SAME

(71) Applicants: Dow Global Technologies LLC, Midland, MI (US); Rohm and Haas Company, Collegeville, PA (US); Dow Silicones Corporation, Midland, MI (US)

(72) Inventors: Xiangting Dong, Shanghai (CN); Ling Li, Louyang (CN); Zhihua Liu, Shanghai (CN); Hui Liu, Shanghai (CN); Wei Cui, Shanghai (CN); Baoqing Zheng, Shanghai (CN); Zhi Juan Gong, Shanghai (CN); Yan Wu, Shanghai (CN); Changkun Piao, Shanghai (CN); Jia Tang, Shanghai (CN); Dong Yun, Shanghai (CN)

(73) Assignees: Dow Global Technologies LLC, Midland, MI (US); Rohm and Haas Company, Collegeville, PA (US); Dow Silicones Corporation, Midland, MI (US)

( * ) Notice: Subject to any disclaimer, the term of this patent is extended or adjusted under 35 U.S.C. 154(b) by 525 days.

(21) Appl. No.: 17/611,696

(22) PCT Filed: Jun. 13, 2019

(86) PCT No.: PCT/CN2019/091108
§ 371 (c)(1),
(2) Date: Nov. 16, 2021

(87) PCT Pub. No.: WO2020/248189
PCT Pub. Date: Dec. 17, 2020

(65) Prior Publication Data
US 2022/0213322 A1 Jul. 7, 2022

(51) Int. Cl.
| | | |
|---|---|---|
| C08L 83/04 | (2006.01) |
| C08F 2/00 | (2006.01) |
| C08F 2/01 | (2006.01) |
| C08F 2/22 | (2006.01) |
| C08F 212/08 | (2006.01) |
| C08F 220/06 | (2006.01) |
| C08F 220/14 | (2006.01) |
| C08F 220/18 | (2006.01) |
| C08F 220/56 | (2006.01) |
| C08F 230/08 | (2006.01) |
| C08G 77/16 | (2006.01) |
| C08G 77/20 | (2006.01) |
| C09D 7/65 | (2018.01) |

(52) U.S. Cl.
CPC .............. *C08L 83/04* (2013.01); *C08F 2/001* (2013.01); *C08F 2/22* (2013.01); *C08F 212/08* (2013.01); *C08F 220/06* (2013.01); *C08F 220/14* (2013.01); *C08F 220/1804* (2020.02); *C08F 220/1808* (2020.02); *C08F 220/56* (2013.01); *C08F 230/085* (2020.02); *C08G 77/16* (2013.01); *C08G 77/20* (2013.01); *C09D 7/65* (2018.01); *C08G 2150/00* (2013.01); *C08L 2201/50* (2013.01); *C08L 2205/02* (2013.01)

(58) Field of Classification Search
CPC .. C08L 83/04; C08L 2201/50; C08L 2205/02; C09D 7/65; C08F 220/1804; C08F 230/085; C08F 220/1808; C08F 2/001; C08F 2/22; C08F 212/08; C08F 220/06; C08F 220/14; C08F 220/56; C08G 77/16; C08G 77/20; C08G 2150/00
USPC ........................................................ 524/837
See application file for complete search history.

(56) References Cited

U.S. PATENT DOCUMENTS

| | | | |
|---|---|---|---|
| 5,852,095 A | 12/1998 | Yamauchi et al. |
| 6,420,480 B1 | 7/2002 | Ozdeger et al. |
| 6,534,590 B1 | 3/2003 | Aso et al. |
| 8,030,391 B2 | 10/2011 | Petri et al. |
| 9,175,185 B2 | 11/2015 | Fichtner et al. |
| 9,862,856 B2 | 1/2018 | Yang et al. |
| 2009/0035587 A1 | 2/2009 | Killilea et al. |
| 2016/0145430 A1 | 5/2016 | Junk et al. |
| 2018/0326430 A1 | 11/2018 | Moenkemoeller et al. |

FOREIGN PATENT DOCUMENTS

| | | | | |
|---|---|---|---|---|
| AU | 200149803 | | 11/2001 | |
| CA | 2698164 A1 | * | 3/2009 | ............ C08F 293/00 |
| CN | 1142834 | | 2/1997 | |
| CN | 101218270 | | 7/2008 | |

(Continued)

OTHER PUBLICATIONS

Li et al., "A novel acrylate-PDMS composite latex with controlled phase compatibility prepared by emulsion polymerization," J. Coat. Technol. Res., 2017, pp. 1259-1269, vol. 14, No. 6.

(Continued)

*Primary Examiner* — Kelechi C Egwim
(74) *Attorney, Agent, or Firm* — Susan M. Zerull

(57) ABSTRACT

An aqueous dispersion comprising a multistage polymer comprising a first polymer and a second polymer that comprises structural units of an ethylenically unsaturated siloxane monomer, the multistage polymer comprising, by weight based on the weight of the multistage polymer, 4.5% or more of structural units of the ethylenically unsaturated siloxane monomer, and the coagulum content of the aqueous dispersion is less than 2,000 ppm after filtration through a 44 micron sieve.

12 Claims, No Drawings

(56) References Cited

FOREIGN PATENT DOCUMENTS

| | | | |
|---|---|---|---|
| CN | 101348637 | 1/2009 | |
| CN | 101357965 A | 2/2009 | |
| CN | 103270061 | 8/2013 | |
| EP | 1095953 B1 | 3/2009 | |
| GB | 1149935 | 4/1969 | |
| KR | 100378520 B1 | 3/2003 | |
| WO | 2001085865 | 11/2001 | |
| WO | 2014107867 | 7/2014 | |
| WO | 2014190515 | 12/2014 | |
| WO | 2017121442 | 7/2017 | |
| WO | 2018119721 | 7/2018 | |
| WO | WO-2018119721 A1 * | 7/2018 | ............. C08F 2/001 |

OTHER PUBLICATIONS

Deng et al., "Synthesis and surface properties of PDMS-acrylate emulsion with gemini surfactant as co-encounter", Colloid Polym. Sci., vol. 285, 2007; pp. 923-930.

Luo et al., "The influence of monomer types on the colloidal stability in the miniemulsion copolymerization invoilving alkoxysilane monomer", Polymer, vol. 47, 2006; pp. 4959-4966.

Supplementary European Search Report for the corresponding European Application No. 19932847; Date of Completion: Jan. 30, 2023; 10 pages.

\* cited by examiner

AQUEOUS POLYMER DISPERSION AND PROCESS OF MAKING THE SAME

FIELD OF THE INVENTION

The present invention relates to an aqueous multistage polymer dispersion and a process of making the same.

INTRODUCTION

Aqueous or waterborne coating compositions are becoming increasingly more important than solvent-based coating compositions for less environmental problems. Aqueous coating compositions are typically formulated using aqueous polymer dispersions as binders. Aqueous polymer dispersions are typically prepared by free-radical polymerization, particularly emulsion polymerization, of conventional monomers such as butyl acrylate, 2-ethylhexyl acrylate, styrene, methyl methacrylate or mixtures thereof.

Recently, incorporation of more hydrophobic monomers such as ethylenically unsaturated siloxane monomers into the polymer backbone during emulsion polymerization can be one approach to further improve coatings' performance, such as water repellency. However, a large amount of coagulum (e.g., more than 2,000 ppm) may be formed in a conventional emulsion polymerization process when ethylenically unsaturated siloxane monomers are included in an amount of more than 4.5% by weight of total monomers. Depending on applications, aqueous coating compositions may have different desirable properties. For example, durability is a key property in exterior applications to enable coatings to maintain color and gloss upon exposure to the elements such as sunlight. Moreover, metal protective coatings are desired to have anti-corrosion properties to meet industry requirements.

Therefore, it is desirable to provide a stable aqueous polymer dispersion with reduced coagulum, which can provide coatings with the above-described properties.

SUMMARY OF THE INVENTION

The present invention provides a novel aqueous dispersion with reduced coagulum comprising a multistage polymer comprising at least a first polymer and a second polymer. The multistage polymer in the aqueous dispersion comprises 4.5% or more of structural units of a specific ethylenically unsaturated siloxane monomer, by weight based on the weight of the multistage polymer. A coating composition comprising such aqueous dispersion can provide coating films with durability and anti-corrosion properties.

In a first aspect, the present invention is an aqueous dispersion comprising a multistage polymer, wherein the multistage polymer comprises at least a first polymer and a second polymer, wherein the second polymer comprises structural units of an ethylenically unsaturated siloxane monomer of formula (I), (II) or (III),

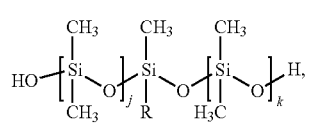

(I)

wherein, in formula (I), R is an ethylenically unsaturated group, and j and k are each independently in the range of from 0 to 100, and j+k=5 to 100;

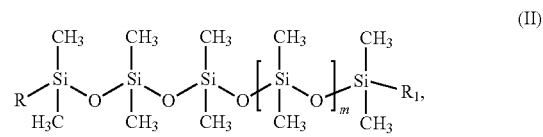

(II)

wherein, in formula (II), R is an ethylenically unsaturated group, $R_1$ is a hydroxyl, alkyl, aryl, alkoxyl, aryloxy, alkyl ether, or aryl ether group, and m is from 1 to 100;

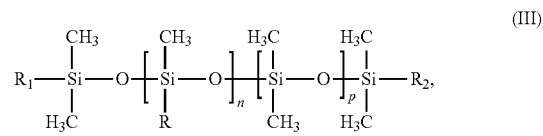

(III)

wherein, in formula (III), R is an ethylenically unsaturated group, $R_1$ and $R_2$ are each independently a hydroxyl, alkyl, aryl, alkoxyl, aryloxy, alkyl ether, or aryl ether group, n is from 1 to 5, and p is from 1 to 100;

wherein the multistage polymer comprises, by weight based on the weight of the multistage polymer, 4.5% or more of structural units of the ethylenically unsaturated siloxane monomer, and wherein the coagulum content of the aqueous dispersion is less than 2,000 ppm after filtration through a 44 micron sieve.

In a second aspect, the present invention is a process for preparing the aqueous dispersion comprising a multistage polymer of the first aspect. The process comprises:

preparing a first polymer by emulsion polymerization;

dispersing in the first polymer, a second monomer composition comprising an ethylenically unsaturated siloxane monomer, whereby the second monomer composition swells the first polymer, and polymerizing the second monomer composition within the monomer-swollen first polymer to form a second polymer, thus to obtain the aqueous dispersion with a coagulum content of less than 2,000 ppm after filtration through a 44 micron sieve;

wherein the multistage polymer comprising the first polymer and the second polymer comprises, by weight based on the weight of the multistage polymer, 4.5% or more of structural units of the ethylenically unsaturated siloxane monomer; and wherein the ethylenically unsaturated siloxane monomer has formula (I), (II) or (III),

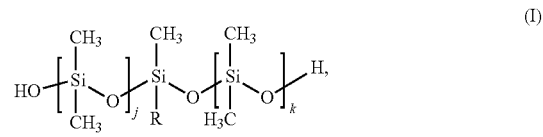

(I)

wherein, in formula (I), R is an ethylenically unsaturated group, and j and k are each independently in the range of from 0 to 100, and j+k=5 to 100;

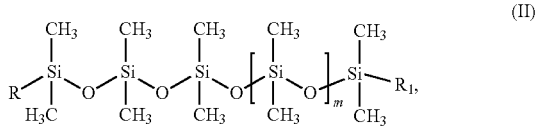

wherein, in formula (II), R is an ethylenically unsaturated group, $R_1$ is a hydroxyl, alkyl, aryl, alkoxyl, aryloxy, alkyl ether, or aryl ether group, and m is from 1 to 100;

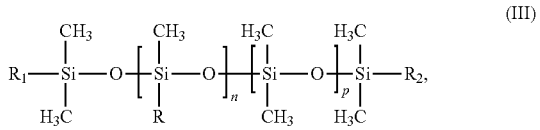

wherein, in formula (III), R is an ethylenically unsaturated group, $R_1$ and $R_2$ are each independently a hydroxyl, alkyl, aryl, alkoxyl, aryloxy, alkyl ether, or aryl ether group, n is from 1 to 5, and p is from 1 to 100.

In a third aspect, the present invention is an aqueous coating composition comprising the aqueous dispersion of the first aspect.

DETAILED DESCRIPTION OF THE INVENTION

"Aqueous" composition or dispersion herein means that particles dispersed in an aqueous medium. By "aqueous medium" herein is meant water and from 0 to 30%, by weight based on the weight of the medium, of water-miscible compound(s) such as, for example, alcohols, glycols, glycol ethers, glycol esters, and the like.

"Acrylic" as used herein includes (meth)acrylic acid, (meth)alkyl acrylate, (meth)acrylamide, (meth)acrylonitrile and their modified forms such as (meth)hydroxyalkyl acrylate. Throughout this document, the word fragment "(meth) acryl" refers to both "methacryl" and "acryl". For example, (meth)acrylic acid refers to both methacrylic acid and acrylic acid, and methyl (meth)acrylate refers to both methyl methacrylate and methyl acrylate.

"Structural units", also known as "polymerized units", of the named monomer, refers to the remnant of the monomer after polymerization, that is, polymerized monomer or the monomer in polymerized form. For example, a structural unit of methyl methacrylate is as illustrated:

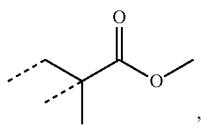

where the dotted lines represent the points of attachment of the structural unit to the polymer backbone.

The aqueous dispersion of the present invention comprises a multistage polymer that comprises at least two polymers, a first polymer and a second polymer, and optionally an additional polymer. By "multistage polymer" herein is meant polymer particles prepared by the sequential addition of two or more different monomer compositions. By "first polymer" (also as "first stage polymer") and "second polymer" (also as "second stage polymer") herein are meant the first polymer and the second polymer having different compositions and formed in different stages of multistage free-radical polymerization in preparing the multistage polymer. The multistage polymer is typically a multistage emulsion polymer.

The first polymer and/or the second polymer in the multistage polymer may each independently comprise structural units of one or more ethylenically unsaturated siloxane monomers, preferably one or more (meth)acrylate functional siloxanes. Preferably, the second polymer comprises structural units of the ethylenically unsaturated siloxane monomer. The ethylenically unsaturated siloxane monomers useful in the present invention may have the structure represented by formula (I), (II), or (III),

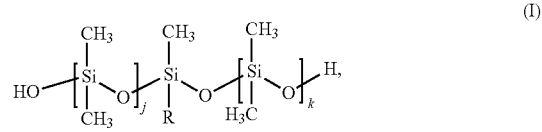

wherein, in formula (I), R is an ethylenically unsaturated group including, for example, $-CH=CH_2$, $-R_p-OC(=O)CH=CH_2$, or $-R_p-OC(=O)C(CH_3)=CH_2$, where $R_p$ is a $C_1$-$C_6$ bivalent hydrocarbon group, preferably, R is $-CH_2CH_2CH_2OC(=O)CH=CH_2$ or $-CH_2CH_2CH_2OC(=O)C(CH_3)=CH_2$; and j and k are each independently in the range of from 0 to 100, from 0 to 80, from 0 to 60, from 5 to 50, from 10 to 40, or from 10 to 20, and j+k=5 to 100, for example, from 5 to 50, from 8 to 50, from 10 to 40, from 10 to 30, or from 10 to 25;

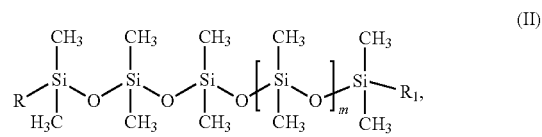

wherein, in formula (II), R is an ethylenically unsaturated group including, for example, $-CH=CH_2$, $-R_p-OC(=O)CH=CH_2$, or $-R_p-OC(=O)C(CH_3)=CH_2$, where $R_p$ is a $C_1$-$C_6$ bivalent hydrocarbon group, preferably, R is $-CH_2CH_2CH_2OC(=O)CH=CH_2$ or $-CH_2CH_2CH_2OC(=O)C(CH_3)=CH_2$; and $R_1$ is a hydroxyl, alkyl, aryl, alkoxyl, aryloxy, alkyl ether, or aryl ether group, preferably a hydroxyl group, or an alkyl, alkoxyl, or alkyl ether group having carbon atoms in the range of from 1 to 15, from 1 to 10, or from 1 to 5, for example, $-CH_3$, $-OH$, $-OCH_3$, or $-OCH_2CH_3$; and m is from 1 to 100, from 5 to 80, from 10 to 60, from 10 to 40, or from 10 to 20;

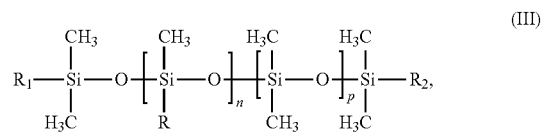

wherein, in formula (III), R is an ethylenically unsaturated group including, for example, $-CH=CH_2$, $-R_p-OC(=O)CH=CH_2$, or $-R_p-OC(=O)C(CH_3)$ =CH$_2$, where R$_p$ is a C$_1$-C$_6$ bivalent hydrocarbon group, preferably, R is —CH$_2$CH$_2$CH$_2$OC(=O) CH=CH$_2$ or —CH$_2$CH$_2$CH$_2$OC(=O)C(CH$_3$)=CH$_2$; R$_1$ and R$_2$ are the same or different and each independently a hydroxyl, alkyl, aryl, alkoxyl, aryloxy, alkyl ether, or aryl ether group, preferably a hydroxyl group, or an alkyl, alkoxyl, or alkyl ether group having carbon atoms in the range of from 1 to 15, from 1 to 10, or from 1 to 5, for example, —CH$_3$, —OH, —OCH$_3$, or —OCH$_2$CH$_3$; and n is from 1 to 5, from 1 to 4, from 1 to 3, or from 1 to 2; and p is from 1 to 100, from 5 to 80, from 5 to 60, from 8 to 40, or from 8 to 20. Suitable commercially available ethylenically unsaturated siloxane monomers may include, for example, DOWSIL™ 32 a methacrylate siloxane monomer available from The Dow Chemical Company (DOWSIL is a trademark of The Dow Chemical Company).

The structural units of the ethylenically unsaturated siloxane monomer in the multistage polymer may be present, by weight based on the weight of the multistage polymer, in a combined amount of 4.5% or more, for example, 4.6% or more, 4.7% or more, 4.8% or more, 4.9% or more, 5.0% or more, 5.1% or more, 5.2% or more, 5.3% or more, 5.4% or more, 5.5% or more, 5.6% or more, 5.7% or more, 5.8% or more, 5.9% or more, 6.0% or more, 6.5% or more, 7% or more, 7.5% or more, 8% or more, 8.5% or more, or even 9% or more, and at the same time, 40% or less, 38% or less, 35% or less, 32% or less, 30% or less, 28% or less, 25% or less, 22% or less, 20% or less, 19% or less, 18% or less, 17% or less, 16% or less, 15% or less, 14% or less, 13% or less, 12% or less, 11% or less, or even 10% or less. In some embodiments, the structural units of the ethylenically unsaturated siloxane monomer in the multistage polymer are all or mostly present in the second polymer, for example, the combined amount of structural units of the ethylenically unsaturated siloxane monomer in the multistage polymer described above may be the same as that of structural units of the ethylenically unsaturated siloxane monomer in the second polymer by weight based on the weight of the multistage polymer. "Weight of the multistage polymer" in the present invention refers to the dry or solids weight of the multistage polymer. The structural units of the ethylenically unsaturated siloxane monomer may be present in the first polymer and/or the second polymer. For example, the first polymer in the multistage polymer may comprise, by weight based on the weight of the first polymer, less than 5% of structural units of the ethylenically unsaturated siloxane monomer, for example, 4.8% or less, 4.5% or less, 4.2% or less, 4% or less, 3.8% or less, 3.5% or less, 3.2% or less, 3.0% or less, 2.8% or less, 2.5% or less, 2.2% or less, 2.0% or less, 1.8% or less, 1.5% or less, 1.2% or less, 1.0% or less, 0.8% or less, 0.5% or less, 0.2% or less, or even 0.1% or less. The second polymer in the multistage polymer may comprise, by weight based on the weight of the second polymer, 5% or more of structural units of the ethylenically unsaturated siloxane monomer, for example 7.5% or more, 10% or more, 12.5% or more, 15% or more, 17.5% or more, 20% or more, or even 22.5% or more, and at the same time, 100% or less, 90% or less, 80% or less, 70% or less, 60% or less, 50% or less, 45% or less, or even 40% or less.

The first polymer and/or the second polymer in the multistage polymer may each independently comprise structural units of one or more ethylenically unsaturated functional monomer carrying at least one functional group selected from an amide, ureido, carboxyl, carboxylic anhydride, hydroxyl, or sulfonic acid group, a salt thereof, or mixtures thereof. Examples of suitable ethylenically unsaturated functional monomers comprise a, (3-ethylenically unsaturated carboxylic acids including an acid-bearing monomer such as methacrylic acid, acrylic acid, itaconic acid, maleic acid, or fumaric acid; or a monomer bearing an acid-forming group which yields or is subsequently convertible to, such an acid group such as anhydride, (meth)acrylic anhydride, or maleic anhydride; sodium styrene sulfonate (SSS), sodium vinyl sulfonate (SVS), 2-acrylamido-2-methylpropanesulfonic acid (AMPS), sodium salt of 2-acrylamido-2-methyl-1-propanesulfonic acid, ammonium salt of 2-acrylamido-2-methyl-1-propane sulfonic acid; sodium salt of allyl ether sulfonate; acrylamide, methacrylamide, monosubstituted (meth)acrylamide, N-methylacrylamide, N-ethylacrylamide, N-isopropylacrylamide, N-butylacrylamide, N-tertiary butylacrylamide, N-2-ethylhexylacrylamide, N,N-dimethylacrylamide, N,N-diethylacrylamide; hydroxyfunctional alkyl (meth)acrylates such as hydroxyethyl (meth)acrylate and hydroxypropyl (meth)acrylate; ureidofunctional monomers such as hydroxyethyl ethylene urea methacrylate, hydroxyethyl ethylene urea acrylate, such as SIPOMER WAM II available from Solvay, methylacrylamidoethyl ethylene urea, or mixtures thereof. Preferred ethylenically unsaturated functional monomers are acrylic acid, sodium styrene sulfonate, acrylamide, methacrylamide, methacrylic acid, or mixtures hereof. In some embodiments, the first polymer comprises structural units of the ethylenically unsaturated functional monomer. The first polymer and/or the second polymer in the multistage polymer may comprise, by weight based on the weight of the first polymer or the second polymer, respectively, zero or more, 0.1% or more, 0.2% or more, 0.5% or more, 0.6% or more, 0.7% or more, 0.8% or more, 0.9% or more, 1.0% or more, 1.1% or more, or even 1.2% or more, and at the same time, 20% or less, 15% or less, 10% or less, 8% or less, 6% or less, 5% or less, 4.5% or less, 4% or less, 3.5% or less, 3% or less, 2.5% or less, 2% or less, or even 1.5% or less of structural units of the ethylenically unsaturated functional monomer.

The first polymer and/or the second polymer in the multistage polymer may each independently also comprise structural units of one or more additional ethylenically unsaturated nonionic monomers that are different from the monomers described above. The term "nonionic monomers" herein refers to monomers that do not bear an ionic charge between pH=1-14. Suitable examples of additional ethylenically unsaturated nonionic monomers include alkyl esters of (meth)acrylic acids having from 2 to 30 carbon atoms or from 2 to 18 carbon atoms such as methyl acrylate, methyl methacrylate, ethyl acrylate, 2-ethylhexyl acrylate, butyl (meth)acrylate, iso-butyl (meth)acrylate, tert-butyl (meth) acrylate, decyl acrylate, isodecyl methacrylate, lauryl (meth) acrylate, and stearyl (meth)acrylate; (meth)acrylonitrile; vinyl aromatic monomers including styrene and substituted styrenes; butadiene; ethylene, propylene, α-olefins such as 1-decene; and vinyl monomers such as vinyl acetate, vinyl butyrate, vinyl chloride, vinylidene chloride, vinyl versatate and other vinyl esters, alkylvinyldialkoxysilanes; vinyltrialkoxysilanes such as vinyltriethoxysilane and vinyltrimethoxysilane; (meth)acrylate functional silanes including, for example, (meth)acryloxyalkyltrialkoxysilanes such as gamma-methacryloxypropyltrimethoxysilane and methacryloxypropyltriethoxysilane; 3-methacryloxypropylmethyldimethoxysilane; 3-methacryloxypropyltrimethoxysilane; 3-methacryloxypropyltriethoxysilane; cycloalkyl (meth) acrylates including cyclohexyl (meth)acrylate, methcyclohexyl (meth)acrylate, dihydrodicyclopentadienyl (meth) acrylate, trimethylcyclohexyl (meth)acrylate, t-butyl (meth) cyclohexyl acrylate; or combinations thereof. Preferred additional ethylenically unsaturated nonionic monomers are butyl acrylate, butyl methacrylate, methyl methacrylate, ethyl acrylate, 2-ethylhexyl acrylate, vinyl acetate, (meth) acrylate functional silanes, styrene, or mixtures thereof. The first polymer may comprise, by weight based on the weight of the first polymer, from 60% to 99%, from 70% to 97%, or from 80% to 95% of structural units of the additional ethylenically unsaturated nonionic monomer. The second polymer may comprise, by weight based on the weight of the second polymer, from 0 to 95%, from 10% to 94.5%, from 20% to 94%, or from 40% to 90%, from 45% to 85%, or from 50% to 80%, of structural units of the additional ethylenically unsaturated nonionic monomer.

The first polymer and/or the second polymer in the multistage polymer may each independently further comprise structural units of one or more multiethylenically unsaturated monomers that are different from the monomers described above. Examples of suitable multiethylenically unsaturated monomers include allyl (meth)acrylate, hexanediol di(meth)arcylate, ethylene glycol di(meth)acrylate, neopentyl glycol di(meth)acrylate, butanediol di(meth)acrylate, trimethylolpropane tri(meth)acrylate, divinyl benzene, allyl acetate, allyl (meth)acrylamide, allyl oxyethyl (meth)acrylate, crotyl (meth)acrylate, dicyclopentenyl (meth)acrylate, dicyclopentenyl ethyl(meth)acrylate, diallyl maleate, and mixtures thereof. The multistage polymer may comprise, by weight based on the weight of the multistage polymer, from zero to 5%, from zero to 2%, or from 0.1% to 1%, of structural units of the multiethylenically unsaturated monomer.

In some embodiments, the first polymer in the multistage polymer may comprise structural units of the ethylenically unsaturated functional monomer and structural units of the additional ethylenically unsaturated nonionic monomers, and the second polymer in the multistage polymer comprises structural units of the ethylenically unsaturated siloxane monomer and optionally structural units of the additional ethylenically unsaturated nonionic monomers.

The first polymer and the second polymer in the multistage polymer may be present at a weight ratio in the range of from 95:5 to 10:90, from 92.5:7.5 to 15:85, from 90:10 to 20:80, from 87.5:12.5 to 25:75, from 85:15 to 30:70, from 82.5:17.5 to 32.5:67.5, from 80:20 to 35:65, from 77.5:22.5 to 37.5 to 62.5, from 75:25 to 40:60, from 72.5:27.5 to 42.5:57.5, from 70:30 to 45:55, from 67.5:32.5 to 47.5:52.5, from 65:35 to 50:50, from 62.5:37.5 to 52.5:47.5, from 60:40 to 55:45, or from 60:40 to 57.5:42.5. Preferably, the weight ratio of the first polymer to the second polymer is in the range of from 90:10 to 20:80, and more preferably, from 80:20 to 30:70. The multistage polymer may comprise one or more additional polymers that are formed, after the first polymer, between the first and second polymer, or after the second polymer.

In some embodiments, the first polymer in the multistage polymer comprises, by weight based on the weight of the first polymer, from 1% to 10% of structural units of the ethylenically unsaturated functional monomer, and from 90% to 99% of structural units of the additional ethylenically unsaturated nonionic monomer such as vinyl aromatic monomers, alkyl esters of (meth)acrylic acids, or mixtures thereof; and the second polymer comprises, by weight based on the weight of the second polymer, from 10% to 80% of structural units of the ethylenically unsaturated siloxane monomer, structural units of the additional ethylenically unsaturated nonionic monomer, and optionally structural units of the ethylenically unsaturated functional monomer, for example, in an amount of from zero to 10%; wherein the weight ratio of the first polymer to the second polymer is in the range of from 90:10 to 20:80.

The types and levels of the monomers described above may be chosen to provide the multistage polymer with a glass transition temperature (Tg) suitable for different applications. The Tg of the multistage polymer may be in the range of from −70 to 80° C., from −50 to 60° C., from −30 to 50° C., or from −20 to 40° C. Tg can be measured by differential scanning calorimetry (DSC), for example, on a TA Instrument DSC Q2000 under a nitrogen ($N_2$) atmosphere, with three cycles including, from −80 to 160° C. at a rate of 10° C./min followed by holding for 5 minutes ($1^{st}$ cycle), from 160 to −80° C. at a rate of 10° C./min ($2^{nd}$ cycle), and from −80 to 160° C. at a rate of 10° C./min ($3^{rd}$ cycle). Tg is determined from the $3^{rd}$ cycle by taking the mid-point in the heat flow versus temperature transition as the Tg value.

The multistage polymer useful in the present invention may have a weight average molecular weight ($M_w$) of 50,000 grams per mole (g/mol) or more, 60,000 g/mol or more, 70,000 g/mol or more, 80,000 g/mol or more, 90,000 g/mol or more, 100,000 g/mol or more, 110,000 g/mol or more, 120,000 g/mol or more, 130,000 g/mol or more, 140,000 g/mol or more, 150,000 g/mol or more, 160,000 g/mol or more, 170,000 g/mol or more, 180,000 g/mol or more, or even 190,000 g/mol or more, and at the same time, 10,000,000 g/mol or less, 9,000,000 g/mol or less, 8,000,000 g/mol or less, 7,000,000 g/mol or less, 6,000,000 g/mol or less, 5,000,000 g/mol or less, 4,000,000 g/mol or less, 3,000,000 g/mol or less, 2,000,000 g/mol or less, 1,000,000 g/mol or less, or even 500,000 g/mol or less. $M_w$ may be determined by Gel Permeation Chromatography (GPC) analysis as described in the Examples section below.

The aqueous dispersion comprising the multistage polymer of the present invention has a low coagulum content. "Low coagulum content" means a coagulum content of an aqueous dispersion of less than 2,000 parts per million (ppm), preferably, less than 1,900 ppm, less than 1,800 ppm, less than 1,700 ppm, less than 1,600 ppm, less than 1,500 ppm, less than 1,400 ppm, less than 1,300 ppm, less than 1,200 ppm, less than 1,100 ppm, less than 1,000 ppm, less than 900 ppm, less than 800 ppm, less than 700 ppm, less than 600 ppm, or even less than 500 ppm. The coagulum content may be determined by filtering the aqueous dispersion through a sieve having a mesh size of 44 microns (325 mesh), according to the test method described in the Examples section below.

The aqueous dispersion comprising the multistage polymer of the present invention may be prepared by a process comprising: preparing the first polymer by emulsion polymerization; dispersing in the first polymer, a second monomer composition comprising the ethylenically unsaturated siloxane monomer, whereby the second monomer composition swells the first polymer, and polymerizing the second monomer composition within the monomer-swollen first polymer to form the second polymer, thus to obtain the aqueous dispersion comprising the multistage polymer. The first polymer is prepared by emulsion polymerization of a first monomer composition that comprises the monomers described above for forming the structural units of the first polymer, including, for example, the ethylenically unsaturated functional monomer, the additional ethylenically unsaturated nonionic monomers, and optionally other monomers, or mixtures thereof. The obtained aqueous dispersion of the first polymer may be neutralized before the second monomer composition is added. After preparation of the first polymer and prior to the second or subsequent stage(s), a polymerization inhibitor may be added or alternatively, the second or subsequent stage(s) in the process of preparing the aqueous dispersion of the present invention may be undertaken without the addition of the inhibitor. The second monomer composition useful in the present invention comprises the ethylenically unsaturated siloxane monomer, and optionally other monomers described above for forming the structural units of the second polymer. Preferably, the second monomer composition is emulsified firstly by one or more surfactants. The second monomer composition, preferably in the form of an emulsion, may be homogenized typically through a homogenizer, prior to adding into in the first polymer. After preparation of the first polymer, the second monomer composition is then dispersed in the first polymer, for example, the aqueous dispersion of the first polymer, and sufficient time is allowed to permit the second monomer composition to swell the first polymer particles until the second monomer mixture swollen first polymer has been swollen essentially to equilibrium with the ethylenically unsaturated siloxane monomer. For example, the swelling process may be conducted, preferably with stirring, for a certain period of time to minimize coagulum formation during polymerization, thus, to obtain the aqueous dispersion with the low coagulum content. The time for swelling process may be, for example, in the range from 20 to 120 minutes, from 40 to 80 minutes, or from 60 to 80 minutes. The swelling process may be conducted at a temperature of 40° C. or higher, 50° C. or higher, or 60° C. or higher. After the first polymer has been swollen essentially to equilibrium, the second monomer composition may be initiated to polymerize within the second monomer composition-swollen first polymer by emulsion polymerization. This second or subsequent stage polymerization may be initiated by conventional free radical generating initiator systems. The first stage and second or subsequent stage polymerization may be conducted by conventional free radical polymerization process well known in the art. Optionally, the different stages can be formed in different reactors.

Total concentration of monomers for preparing the multistage polymer is equal to 100%. Monomers for preparing the multistate polymer, including the first monomer composition for preparing the first polymer, and the second monomer composition for preparing the second polymer, may be added neat or as an emulsion in water; or added in one or more additions or continuously, linearly or nonlinearly, over the reaction period of preparing the first polymer, the second polymer, respectively, or combinations thereof. Temperature suitable for emulsion polymerization processes may be less than 95° C., in the range of from 50 to 90° C., or in the range of from 70 to 90° C. In the polymerization process of preparing the multistage polymer, free radical initiators may be used. The polymerization process may be thermally initiated or redox initiated emulsion polymerization. Examples of suitable free radical initiators include hydrogen peroxide, t-butyl hydroperoxide, t-amyl hydroperoxide, cumene hydroperoxide, ammonium and/or alkali metal persulfates, sodium perborate, perphosphoric acid, and salts thereof; potassium permanganate, and ammonium or alkali metal salts of peroxydisulfuric acid. The free radical initiators may be used typically at a level of from 0.01% to 1%, or from 0.05% to 0.6%, by weight based on the total weight of monomers. Redox systems comprising the above described initiators coupled with a suitable reductant may be used in the polymerization process. Examples of suitable reductants include sodium sulfoxylate formaldehyde, ascorbic acid, isoascorbic acid, alkali metal and ammonium salts of sulfur-containing acids, such as sodium sulfite, bisulfite, thiosulfate, hydrosulfite, sulfide, hydrosulfide or dithionite, acetone bisulfite, glycolic acid, hydroxymethanesulfonic acid, glyoxylic acid hydrate, lactic acid, glyceric acid, malic acid, tartaric acid and salts of the preceding acids. Metal salts of iron, copper, manganese, silver, platinum, vanadium, nickel, chromium, palladium, or cobalt may be used to catalyze the redox reaction. Chelating agents for the metals may optionally be used.

In the polymerization process, one or more surfactants may be added prior to or during the polymerization of the monomers, or combinations thereof. A portion of surfactants can also be added after the polymerization. These surfactants may include anionic and/or nonionic emulsifiers. Examples of suitable surfactants include alkali metal or ammonium salts of alkyl, aryl, or alkylaryl sulfates, sulfonates or phosphates; alkyl sulfonic acids; sulfosuccinate salts; fatty acids; reactive surfactants; ethoxylated alcohols or phenols; and mixtures thereof. The amount of the surfactants used is typically in the range of from 0.1% to 6%, from 0.3% to 3%, or from 0.5% to 1.5%, by weight based on the weight of total monomers used for preparing the multistage polymer.

After completing the polymerization, the obtained aqueous dispersion comprising the multistage polymer may be optionally neutralized by one or more bases as neutralizers to a pH value, for example, in the range of from 6 to 11, or from 7 to 9. The bases may lead to partial or complete neutralization of the ionic or latently ionic groups of the multistage polymer. Examples of suitable bases include alkali metal or alkaline earth metal compounds such as sodium hydroxide, potassium hydroxide, calcium hydroxide, zinc oxide, magnesium oxide, sodium carbonate; primary, secondary, and tertiary amines, such as ammonia solution, triethyl amine, ethylamine, propylamine, monoisopropylamine, monobutylamine, hexylamine, ethanolamine, diethyl amine, dimethyl amine, di-n-propylamine, tributylamine, triethanolamine, dimethoxyethylamine, 2-ethoxyethylamine, 3-ethoxypropylamine, dimethylethanolamine, diisopropanolamine, morpholine, ethylenediamine, 2-diethylaminoethylamine, 2,3-diaminopropane, 1,2-propylenediamine, neopentanediamine, dimethylaminopropylamine, hexamethylenediamine, 4,9-dioxadodecane-1, 12-diamine, polyethyleneimine or polyvinylamine; aluminum hydroxide; and mixtures thereof.

The multistage polymer particles in the aqueous dispersion of the present invention may have a number average particle size in the range of from 50 to 500 nanometers (nm), from 60 to 400 nm, or from 70 to 300 nm, as determined by Brookhaven BI-90 Plus Particle Size Analyzer.

The aqueous dispersion of the present invention further comprises water, for example, in an amount of from 30% to 90%, from 40% to 80%, or from 50% to 70%, by weight based on the total weight of the aqueous dispersion.

The present invention also relates to an aqueous coating composition comprising the aqueous dispersion described above or the aqueous dispersion obtained by the process above. The aqueous coating composition may comprise the multistage polymer dispersion in an amount of from 10% to 100%, from 20% to 90%, or from 30% to 80%, by wet weight based on the weight of the aqueous coating composition.

The aqueous coating composition of the present invention may further comprise pigments and/or extenders. "Pigment" herein refers to a material which is capable of materially contributing to the opacity or hiding capability of a coating. Such materials typically have a refractive index greater than 1.8. Inorganic pigments typically include metal oxides. Examples of suitable pigments include titanium dioxide (TiO$_2$), zinc oxide, iron oxide, zinc sulfide, anticorrosive pigments such as zinc phosphate and zinc molybdate, carbon black, barium sulfate, barium carbonate and mixtures thereof. TiO$_2$ typically exists in two crystal forms, anastase and rutile. Suitable commercially available TiO$_2$ may include, for example, KRONOS 2310 available from Kronos Worldwide, Inc., Ti-Pure R-706 available from Chemours (Wilmington, Del.), TiONA AT1 available from Cristal, and mixtures thereof. TiO$_2$ may be also available in concentrated dispersion form. "Extender" herein refers to a particulate inorganic material having a refractive index of less than or equal to 1.8 and greater than 1.3. Examples of suitable extenders include calcium carbonate, clay, calcium sulfate, aluminum silicates, silicates, zeolites, mica, diatomaceous earth, solid or hollow glass, ceramic beads, nepheline syenite, feldspar, diatomaceous earth, calcined diatomaceous earth, talc (hydrated magnesium silicate), silica, alumina, kaolin, pyrophyllite, perlite, baryte, wollastonite, opaque polymers such as ROPAQUE™ Ultra E opaque polymer available from The Dow Chemical Company (ROPAQUE is a trademark of The Dow Chemical Company), and mixtures thereof. The aqueous coating composition may have a pigment volume concentration (PVC) of from 0% to 55%, from 5% to 40%, or from 10% to 35%. PVC may be determined according to the following equation:

$$PVC = \frac{\text{Volume of Pigment and extender}}{\text{Dry volume of the coating composition}} \times 100\%.$$

The aqueous coating composition of the present invention may further comprise one or more defoamers. "Defoamers" herein refer to chemical additives that reduce and hinder the formation of foam. Defoamers may be silicone-based defoamers, mineral oil-based defoamers, ethylene oxide/propylene oxide-based defoamers, alkyl polyacrylates and mixtures thereof. The defoamer may be present, by weight based on the total weight of the aqueous coating composition, in an amount of from zero to 5%, from 0.05% to 3%, or from 0.1% to 2%.

The aqueous coating composition of the present invention may further comprise one or more thickeners, also known as "rheology modifiers". The thickeners may include polyvinyl alcohol (PVA), clay materials, acid derivatives, acid copolymers, urethane associate thickeners (UAT), polyether urea polyurethanes (PEUPU), polyether polyurethanes (PEPU), or mixtures thereof. Examples of suitable thickeners include alkali swellable emulsions (ASE) such as sodium or ammonium neutralized acrylic acid polymers; hydrophobically modified alkali swellable emulsions (HASE) such as hydrophobically modified acrylic acid copolymers; associative thickeners such as hydrophobically modified ethoxylated urethanes (HEUR); and cellulosic thickeners such as methyl cellulose ethers, hydroxymethyl cellulose (HMC), hydroxyethyl cellulose (HEC), hydrophobically-modified hydroxy ethyl cellulose (HMHEC), sodium carboxymethyl cellulose (SCMC), sodium carboxymethyl 2-hydroxyethyl cellulose, 2-hydroxypropyl methyl cellulose, 2-hydroxyethyl methyl cellulose, 2-hydroxybutyl methyl cellulose, 2-hydroxyethyl ethyl cellulose, and 2-hydoxypropyl cellulose. Preferably, the thickeners are HEUR, HEC, or mixtures thereof. The thickener may be present, by weight based on the total weight of the aqueous coating composition, in an amount of from zero to 8%, from 0.05% to 3%, or from 0.1% to 1%.

The aqueous coating composition of the present invention may further comprise one or more wetting agents. "Wetting agents" herein refer to chemical additives that reduce the surface tension of a coating composition, causing the coating composition to be more easily spread across or penetrate the surface of a substrate. Wetting agents may be polycarboxylates, anionic, zwitterionic, or non-ionic. The wetting agent may be present, by weight based on the total weight of the aqueous coating composition, from zero to 5%, from 0.05% to 3%, or from 0.1% to 2%.

The aqueous coating composition of the present invention may further comprise one or more coalescents. "Coalescents" herein refer to slow-evaporating solvents that fuse polymer particles into a continuous film under ambient condition. Examples of suitable coalescents include 2-n-butoxyethanol, dipropylene glycol n-butyl ether, propylene glycol n-butyl ether, dipropylene glycol methyl ether, propylene glycol methyl ether, propylene glycol n-propyl ether, diethylene glycol monobutyl ether, ethylene glycol monobutyl ether, ethylene glycol monohexyl ether, triethylene glycol monobutyl ether, dipropylene glycol n-propyl ether, n-butyl ether, or mixtures thereof. Preferred coalescents include dipropylene glycol n-butyl ether, ethylene glycol monobutyl ether, diethylene glycol monobutyl ether, n-butyl ether, or mixtures thereof. The coalescents may be present, by weight based on the total weight of the aqueous coating composition, from zero to 30%, from 0.5% to 20%, or from 2% to 10%.

The aqueous coating composition of the present invention may further comprise one or more dispersants. The dispersants may include nonionic, anionic and cationic dispersants such as polyacids with suitable molecular weight, 2-amino-2-methyl-1-propanol (AMP), dimethyl amino ethanol (DMAE), potassium tripolyphosphate (KTPP), trisodium polyphosphate (TSPP), citric acid and other carboxylic acids. The polyacids used may include homopolymers and copolymers based on polycarboxylic acids (e.g., weight average molecular weight ranging from 1,000 to less than 50,000 as measured by GPC), including those that have been hydrophobically- or hydrophilically-modified, e.g., polyacrylic acid or polymethacrylic acid or maleic anhydride with various monomers such as styrene, acrylate or methacrylate esters, diisobutylene, and other hydrophilic or hydrophobic comonomers; salts of thereof; or mixtures thereof. The dispersant may be present, by weight based on the total weight of the aqueous coating composition, in an amount of from zero to 5%, from 0.05% to 3%, or from 0.1% to 1%.

In addition to the components described above, the aqueous coating composition of the present invention may further comprise any one or combination of the following additives: buffers, neutralizers, humectants, mildewcides, biocides, anti-skinning agents, colorants, flowing agents, anti-oxidants, plasticizers, leveling agents, adhesion promoters, anti-flash rust additives, anticorrosion additives, and grind vehicles. These additives may be present in a combined amount of from zero to 10% or from 0.1% to 2%, by weight based on the total weight of the aqueous coating composition. The aqueous coating composition may also comprise water in an amount of from 30% to 90%, from 40% to 80%, or from 50% to 70% by weight of the aqueous coating composition.

The aqueous coating composition of the present invention may be prepared by a process comprising: admixing the aqueous dispersion comprising the multistage polymer, and other optional components, e.g., the pigments and/or extenders. Components in the aqueous coating composition may be mixed in any order to provide the aqueous coating composition of the present invention. Any of the above-mentioned optional components may also be added to the composition during or prior to the mixing to form the aqueous coating composition. When the aqueous coating composition comprises pigments and/or extenders, the pigments and/or extenders are preferably mixed with the dispersant to form a slurry of pigments and/or extender.

The aqueous coating composition of the present invention can provide coatings made therefrom with improved corrosion resistance. The present invention also provides a method of improving corrosion resistance of a corrosion susceptible substrate, such as metal. The method comprises: applying the aqueous coating composition to a metal substrate, and drying, or allowing to dry, the aqueous coating composition to form a coating. Improved corrosion resistance means blister rating of 6F or better and surface rusted rating of 7S, 7P or even better, preferably, 9S, 9P, or 10, for a coating with a thickness of 40-50 m after exposure to salt spray for at least 240 hours, according to the test method described in the Examples section.

The aqueous coating composition of the present invention can provide coatings with better durability, as indicated by higher gloss retention after exposure to QUV testing for 2,000 hours, and better water repellency, as compared to the same coating composition comprising conventional acrylic polymer containing no structural unit derived from the ethylenically unsaturated siloxane monomer. Gloss retention and water repellency properties may be measured according to the test methods described in the Examples section below.

The present invention also relates to a method of producing a coating on a substrate, preferably an exterior surface, comprising: applying the coating composition to a substrate, and drying, or allowing to dry, the applied coating composition to produce the coating. The aqueous coating composition of the present invention can be applied to, and adhered to, various substrates. Examples of suitable substrates include wood, metals, plastics, foams, stones, elastomeric substrates, glass, fabrics, concrete, or cementitious substrates. The aqueous coating composition, preferably comprising the pigment, is suitable for various applications such as marine protective coatings, general industrial finishes, metal protective coatings, automotive coatings, traffic paints, Exterior Insulation and Finish Systems (EIFS), wood coatings, coil coatings, plastic coatings, can coatings, architectural coatings, and civil engineering coatings. The aqueous coating composition is particularly suitable for metal protective coatings and architectural coatings. The aqueous coating composition can be used as a primer, a topcoat, as one-coat direct-to-metal coating, or in combination with other coatings to form multi-layer coatings.

The aqueous coating composition of the present invention can be applied to a substrate by incumbent means including brushing, dipping, rolling and spraying. The aqueous composition is preferably applied by spraying. The standard spray techniques and equipment for spraying such as air-atomized spray, air spray, airless spray, high volume low pressure spray, and electrostatic spray such as electrostatic bell application, and either manual or automatic methods can be used. After the aqueous coating composition of the present invention has been applied to a substrate, the aqueous coating composition can dry, or allow to dry, to form a film (this is, coating) at room temperature (23±2° C.), or at an elevated temperature, for example, from 35 to 60° C.

EXAMPLES

Some embodiments of the invention will now be described in the following Examples, wherein all parts and percentages are by weight unless otherwise specified.

Methyl methacrylate (MMA), butyl acrylate (BA), methacrylic acid (MAA), and 2-Ethylhexyl acrylate (2-EHA) are all available from The Dow Chemical Company.

Styrene (ST) is available from BASF.

Ethylene urea ethyl methacrylate (EUEMA) is available from Evonik.

Silquest A-174 gamma-methacryloxypropyltrimethoxysilane and Silquest A-189 gamma-mercaptopropyltrimethoxysilane are both available from Momentive Performance Materials.

DOWSIL 32 Additive (DC-32), available from The Dow Chemical Company, is a methacrylate siloxane monomer having the following structure:

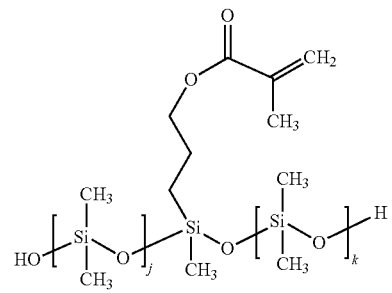

wherein j+k=12~25.

Disponil SLS surfactant (28% active), available from BASF, is sodium lauryl sulphate.

ABS-15 surfactant (16% active), available from Shanghai Honesty Fine Chemical Co., Ltd., is sodium dodecylbenzenesulfonate.

Acrylamide (AM), Sodium persulfate (SPS), Ethylene diamine tetraacetic acid (EDTA), t-Butyl hydroperoxide (t-BHP, 70% active) and isoascorbic acid (IAA) are all available from Shanghai Chemical Reagent Co., Ltd.

4-hydroxy-TEMPO is available from Sigma Aldrich.

OROTAN™ 681 and OROTAN 731A dispersants, available from The Dow Chemical Company, are hydrophobic acrylic copolymer pigment dispersants.

Surfynol TG nonionic wetting agent and Tego Airex 902W defoamer (an emulsion of a polyether siloxane copolymer, containing fumed silica) are both available from Evonik.

Ti-Pure R-706 pigment, available from Chemours, is a titanium dioxide pigment.

Sodium nitrite (15%) is used as an anti-flash rust additive.

ACRYSOL™ RM-8W and ACRYSOL RM-2020NPR rheology modifiers, available from The Dow Chemical Company, are nonionic urethane rheology modifiers.

Texanol ester alcohol, available from Eastman, is used as a coalescent.

Nopco NXZ defoamer is available from Nopoc.

AMP-95 neutralizer is available from ANGUS chemical company.

TRITON™ CF-10 and TRITON X-405 nonionic surfactants are both available from The Dow Chemical Company.

Kathon LXE and Rocima 363 biocides are both available from DuPont.

OROTAN, ACRYSOL, and TRITON are trademarks of The Dow Chemical Company.

The following standard analytical equipment and methods are used in the Examples.

GPC Analysis

GPC analysis was performed generally by Agilent 1200. A sample was dissolved in tetrahydrofuran (THF)/formic acid (FA) (5%) with a concentration of 2 mg/mL and then filtered through 0.45 m polytetrafluoroethylene (PTFE) filter prior to GPC analysis. The GPC analysis is conducted using the following conditions:

Column: One PLgel GUARD columns (10 m, 50 mm×7.5 mm), Two Mixed B columns (7.8 mm×300 mm) in tandem; column temperature: 40° C.; mobile phase: THF/FA (5%); flow rate: 1.0 mL/minute; Injection volume: 100 µL; detector: Agilent Refractive Index detector, 40° C.; and calibration curve: PL Polystyrene I Narrow standards with molecular weights ranging from 2329000 to 580 g/mol, using polynom 3 fitness.

Coagulum Content of Aqueous Polymer Dispersion

An aqueous polymer dispersion was filtered through a 44 micron sieve. The residue remaining on the sieve was washed with water and put in an oven at 150° C. for 20 minutes. Coagulum content is determined by the dry weight of the residue on the sieve divided by the original wet weight of the aqueous polymer dispersion. The lower the coagulum content, the more stable polymerization process in preparing the aqueous dispersion.

Gloss Retention

Gloss retention (%) is used as an indicator of coatings' durability. A higher gloss retention indicates better coating durability. Gloss retention of coating films was determined by Accelerated Weathering Tester (QUV). A coating composition was applied onto Q panels (cold rolled steel) by a 150 µm applicator. The resultant film was then allowed to dry at 23° C. and relative humidity (RH) of 50% for 7 days. Initial 60 degree gloss, denoted as "gloss$_{(before\ QUV\ test)}$", was measured by micro-TRI-gloss machine (BYK Company). The test panels were then placed into the QUV chamber (QUV/Spray Model, Q-Panel Company) with test area facing inward and exposed for 2,000 hours under the following operating conditions:

Setting the wavelength at 340 nm; turning on UV light for 8 hours and controlling the temperature at 60° C.; turning off UV light and keeping the temperature at 40° C. for 4 hours. These procedures mentioned above compose one cycle.

Then the panels were removed from the QUV chamber, allowed to cool and dry, and tested for final 60 degree gloss, denoted as "gloss$_{(after\ QUV\ test)}$".

Gloss retention (%) of the coatings before and after the accelerated durability test was calculated by, Gloss retention (%)=(gloss$_{(after\ QUV\ test)}$/gloss$_{(before\ QUV\ test)}$)×100%.

Salt Spray Resistance Test

A coating composition was applied onto Q panels (cold rolled steel) by a 150 µm applicator. The resultant coating film was allowed to dry at 23° C. and relative humidity (RH) of 50% for 7 days. Salt spray resistance properties were tested by exposure of the as prepared coated panels to a salt spray environment (5% sodium chloride fog) in accordance with ASTM B117-2011. Exposed cold rolled steel was covered with tape (3M plastic tape #471) prior to exposure. A scribe mark made with a razor blade was scratched into the bottom half of the panels obtained above immediately before exposure. The panels were exposed to the salt spray environment for certain hours, and then removed from the salt spray environment. The surface of the panels was first washed by DI water before rating. The results were presented as blister/rust ratings.

Blister ratings were conducted in accordance with ASTM D714-02 (2009) and comprised a number and/or one or more letters, as shown in Table A. The letter F, M, MD or D is a qualitative representation of the density of blisters. The number refers to the size of the blister, whereby 2 is the largest size, 8 is the smallest size, and 10 is no blister. The bigger the number, the smaller the size of blister. Rust ratings are determined by ASTM D610-2001, as shown in Tables B and C. The panels with blister density rating of 6F or better and "7P", "7S" or better are acceptable rating for rust degree, indicating good corrosion resistance of coatings.

TABLE A

| Blister rating criteria | | | |
|---|---|---|---|
| Density of blister | Abbreviation | Size of Blister | Rating |
| Few | F | Very Big blister | 2 |
| Medium | M | Big blister | 4 |
| Medium dense | MD | Small to middle blister | 6 |
| Dense | D | Smallest blister seen by unaided eye | 8 |
| | | No blister | 10 |

TABLE B

| Rust Rating by rusting degree | |
|---|---|
| Rusting degree | Rating |
| Spots | S |
| General | G |
| Pin point | P |

TABLE C

| Rust Rating by surface rusted percentage | |
|---|---|
| Surface Rusted | Rating |
| Less than or equal to 0.01 percent | 10 |
| Greater than 0.01 percent and up to 0.03 percent | 9 |
| Greater than 0.03 percent and up to 0.1 percent | 8 |
| Greater than 0.1 percent and up to 0.3 percent | 7 |
| Greater than 0.3 percent and up to 1.0 percent | 6 |
| Greater than 1.0 percent and up to 3.0 percent | 5 |
| Greater than 3.0 percent and up to 10.0 percent | 4 |
| Greater than 10.0 percent and up to 16.0 percent | 3 |
| Greater than 16.0 percent and up to 33.0 percent | 2 |
| Greater than 33.0 percent and up to 50.0 percent | 1 |
| Greater than 50.0 percent | 0 |

Block Resistance

A coating composition was applied onto the Q panel (cold rolled steel) by a 100 µm applicator. The resultant coating film was allowed to dry at 23° C. and 50% RH for 12 hours. The dry film thickness was about 40-50 µm. Two coated panels were then stacked together (coating film to coating film) with 500 grams weight on top of them and then placed into an oven at 50° C. for 4 hours. The two stacked panels were then separated from each other to evaluate the early block resistance. The area of damaging observed by the naked eye was recorded to evaluate block resistance. The acceptable area of damaging is lower than 10% damage.

Water Repellency

Water repellency represents difficulty for water to wet the coating surface. A coating composition was casted on a Leneta black scrub test panel (P121-10N) by using a 175 μm film caster, starting from the secured end of the panel. The panel was then air dried horizontally at 25° C. for 7 days in a Constant Temperature Room (CTR). The obtained panel was kept vertical so that water drops were allowed to flow from the upper to the bottom side of the panel. Water repellency was visually observed and ranked by beading scores as shown in Table D below. The beading score higher than 3 (>3) after the durable water repellency test indicates water repellency. Otherwise, if the beading score is 3 or lower, it indicates poor water repellency.

TABLE D

Ranking standard for water repellency

| Beading Score | Description |
|---|---|
| 5 | No wetting nor adhesion of water droplets observed on the coating surface |
| 4 | Wetting observed by individual small circular or elliptic water droplets observed on the coating surface |
| 3 | Wetting observed by individual large water droplets on the coating surface |
| 2 | Wetting observed along the discrete track of water on the coating surface |
| 1 | Wetting observed along the thinner track of water on the coating surface |
| 0 | Wetting observed along the entire track of water on the coating surface |

Example (Ex) 1

A monomer emulsion 1 (ME1) was prepared by mixing water (78.3 g), SLS (5.4 g), A-189 (0.34 g), BA (95.0 g), MAA (15.9 g), EUEMA (50% active) (4.5 g), and MMA (112.7 g). A monomer emulsion 2 (ME2) was prepared by mixing water (182.3 g), SLS (18.7 g), DC-32 (263.8 g), A-174 (2.7 g) and MMA (260.1 g).

In a glass reactor, charged with water (420.0 g), SLS (7.0 g), sodium carbonate (2.1 g) and SPS (1.5 g). When the reactor was heated to 87° C., the ME1 was fed into the reactor over 30 minutes. At 82° C., a solution of isoascorbic acid (IAA) (0.5 g) in DI water (15.0 g) was fed into the reactor. Ammonia solution was further added to adjust pH value to about 8.0~8.5 and kept stirring for 20 minutes. 4-Hydroxy-TEMPO (0.02 g) was then added to the reactor. Then, the ME2 was pumped into the reactor through a homogenizer over about 20 minutes, and the contents of the reactor were agitated for around 120 minutes. $FeSO_4 \cdot 7H_2O$ (0.006 g) was mixed with a salt of EDTA (0.03 g) in water (8.0 g) and added into the reactor. A solution of t-BHP (0.80 g t-BHP dissolved in 10.0 g DI water) and a solution of IAA (0.50 g) in DI water (11.0 g) were further fed into the reactor over 10 minutes. At around 70° C., a solution of t-BHP (0.6 g t-BHP dissolved in 10.0 g DI water) and a solution of IAA (0.35 g IAA dissolved in 11.0 g DI water) were fed into the reactor for 30 minutes. Finally, the obtained dispersion was cooled to room temperature and then filtered with a 44 micron sieve to determine the coagulum content.

Ex 2

A monomer emulsion 1 (ME1) was prepared by mixing water (182.7 g), SLS (9.4 g), A-189 (0.80 g), BA (219.0 g), MAA (14.9 g), EUEMA (50% active) (7.4 g), and MMA (289.3 g). A monomer emulsion 2 (ME2) was prepared by mixing water (78.3 g), SLS (8.0 g), 2-EHA (63.5 g), DC-32 (36.2 g), A-174 (1.2 g) and MMA (125.1 g).

In a glass reactor, charged with water (420.0 g), Disponil SLS (7.0 g), sodium carbonate (2.3 g) and SPS (2.3 g). When the reactor was heated to 87° C., the ME1 was fed into the reactor over 62 minutes. At 82° C., a solution of IAA (0.6 g) in DI water (15.0 g) was fed into the reactor. Ammonia solution was further added to adjust pH value to about 8.0~8.5 and kept stirring for 20 minutes. 4-Hydroxy-TEMPO (0.02 g) was then added to the reactor. Then, the ME2 was pumped into the reactor through a homogenizer over about 20 minutes, and the contents of the reactor were agitated for around 90 minutes. $FeSO_4 \cdot 7H_2O$ (0.006 g) was mixed with a salt of EDTA (0.03 g) in water (8.0 g) and added into the reactor. A solution of t-BHP (0.60 g t-BHP dissolved in 10.0 g DI water) and a solution of IAA (0.30 g) in DI water (11.0 g) were further fed into the reactor over 10 minutes. At around 70° C., a solution of t-BHP (0.6 g t-BHP dissolved in 10.0 g DI water) and a solution of IAA (0.35 g IAA dissolved in 11.0 g DI water) were fed into the reactor for 30 minutes. Finally, the obtained dispersion was cooled to room temperature and then filtered with a 44 micron sieve to determine the coagulum content.

Ex 3

The aqueous dispersion of Ex 3 was prepared as in Ex 2 except the monomer emulsions used were prepared as follows, A monomer emulsion 1 (ME1) was prepared by mixing water (182.7 g), SLS (9.4 g), A-189 (0.80 g), BA (219.0 g), MAA (14.9 g), EUEMA (50% active) (7.4 g), and MMA (289.3 g). A monomer emulsion 2 (ME2) was prepared by mixing water (78.3 g), SLS (8.0 g), 2-EHA (31.7 g), DC-32 (67.9 g), A-174 (1.2 g) and MMA (125.1 g).

Ex 4

The aqueous dispersion of Ex 4 was conducted as in Ex 2 except the monomer emulsions used were prepared as follows, A monomer emulsion 1 (ME1) was prepared by mixing water (182.7 g), SLS (9.4 g), A-189 (0.80 g), BA (219.0 g), MAA (14.9 g), EUEMA (50% active) (7.4 g), and MMA (289.3 g). A monomer emulsion 2 (ME2) was prepared by mixing water (78.3 g), SLS (8.0 g), BA (40.7 g), DC-32 (67.9 g), A-174 (1.2 g) and MMA (116.1 g).

Ex 5

The aqueous dispersion of Ex 5 was prepared as in Ex 2 except the monomer emulsions used were prepared as follows, A monomer emulsion 1 (ME1) was prepared by mixing water (182.7 g), SLS (9.4 g), A-189 (0.80 g), BA (219.0 g), MAA (14.9 g), EUEMA (50% active) (7.4 g), and MMA (289.3 g). A monomer emulsion 2 (ME2) was prepared by mixing water (78.3 g), SLS (8.0 g), DC-32 (112.5 g), A-174 (1.2 g) and MMA (111.6 g).

Ex 6

The aqueous dispersion of Ex 6 was prepared as in Ex 2 except the monomer emulsions used were prepared as follows, A monomer emulsion 1 (ME1) was prepared by mixing water (182.7 g), SLS (9.4 g), BA (221.6 g), MAA (15.9 g), AM (2.6 g), and MMA (286.7 g). A monomer emulsion 2 (ME2) was prepared by mixing water (78.3 g), SLS (8.0 g), BA (49.8 g), DC-32 (112.5 g), and MMA (63.1 g).

Ex 7

The aqueous dispersion of Ex 7 was prepared as in Ex 2 except the monomer emulsions used were prepared as follows, A monomer emulsion 1 (ME1) was prepared by mixing water (208.8 g), SLS (10.7 g), BA (253.3 g), MAA (15.2 g), AM (3.0 g), and MMA (330.7 g). A monomer emulsion 2 (ME2) was prepared by mixing water (52.3 g), SLS (5.4 g), BA (49.8 g), DC-32 (37.5 g), and MMA (63.1 g).

Ex 8

The aqueous dispersion of Ex 8 was prepared as in Ex 2 except the monomer emulsions used were prepared as follows, A monomer emulsion 1 (ME1) was prepared by mixing water (156.6 g), SLS (8.0 g), BA (190.0 g), MAA (15.9 g), AM (2.3 g), and MMA (243.5 g). A monomer emulsion 2 (ME2) was prepared by mixing water (104.4 g), SLS (10.7 g), BA (66.3 g), DC-32 (150.0 g), and MMA (84.2 g).

Ex 9

A monomer emulsion 1 (ME1) was prepared by mixing water (208.8 g), SLS (10.7 g), BA (253.3 g), MAA (15.2 g), AM (3.0 g), and MMA (330.6 g). A monomer emulsion 2 (ME2) was prepared by mixing water (52.2 g), SLS (5.3 g), BA (33.1 g), DC-32 (75.0 g), and MMA (42.1 g).

In a glass reactor, charged with water (420.0 g), SLS (7.0 g), sodium carbonate (2.3 g) and SPS (2.6 g). When the reactor was heated to 87° C., the ME1 was fed into the reactor over 72 minutes. Then at 83° C., ammonia solution was added to adjust pH value to about 8.0~8.5 and kept stirring for 20 minutes. 4-Hydroxy-TEMPO (0.015 g) was added to the reactor. Then the ME2 was pumped into the reactor through a homogenizer over about 20 minutes, and the contents of the reactor were agitated for around 40-45 minutes. $FeSO_4 \cdot 7H_2O$ (0.008 g) was mixed with a salt of EDTA (0.04 g) in water (8.0 g) and added into the reactor. A solution of t-BHP (0.90 g) in DI water (10.0 g) and a solution of IAA (0.55 g) in DI water (11.0 g) were further fed into the reactor over 10 minutes. At around 70° C., a solution of t-BHP (0.6 g) in DI water (10.0 g) and a solution of IAA (0.32 g) in DI water (11.0 g) were fed into the reactor for 20 minutes. Finally, the obtained dispersion was cooled to room temperature and then filtered with a 44 micron sieve to determine the coagulum content.

Ex 10

A monomer emulsion 1 (ME1) was prepared by mixing water (170.0 g), ABS-15 (21.5 g), BA (105.6 g), 2-EHA (105.5 g), MAA (8.5 g), AM (12.6 g), and ST (295.2 g). A monomer emulsion 2 (ME2) was prepared by mixing water (78.3 g), ABS-15 (8.4 g), BA (79.1 g), DC-32 (45.0 g), and MMA (101.5 g).

In a glass reactor, charged with water (490.0 g), ABS-15 (11.3 g), ammonia solution (26%, 1.0 g) and SPS (2.3 g). When the reactor was heated to 87° C., the ME1 was fed into the reactor over 84 minutes. At 82° C., a solution of IAA (0.6 g) in DI water (15.0 g) was fed into the reactor. Ammonia solution was further added to adjust pH value to about 8.0~8.5 and kept stirring for 20 minutes. 4-Hydroxy-TEMPO (0.02 g) was added to the reactor. Then, the ME2 was pumped into the reactor through a homogenizer over about 20 minutes, then continue to agitate for around 60 minutes. $FeSO_4 \cdot 7H_2O$ (0.006 g) was mixed with a salt of EDTA (0.03 g) in water (8.0 g) and added into the reactor. A solution of t-BHP (0.90 g) in DI water (10.0 g) and a solution of IAA (0.50 g) in DI water (11.0 g) were further fed into the reactor over 10 minutes. At around 70° C., a solution of t-BHP (0.6 g) in DI water (10.0 g) and a solution of IAA (0.3 g) in DI water (11.0 g) were fed into the reactor for 20 minutes. Finally, the obtained dispersion was cooled to room temperature and then filtered with a 44 micron sieve to determine the coagulum content.

Ex 11

The aqueous dispersion of Ex 11 was prepared as in Ex 10 except the monomer emulsions used were prepared as follows, A monomer emulsion 1 (ME1) was prepared by mixing water (170.0 g), ABS-15 (21.5 g), BA (105.6 g), 2-EHA (105.5 g), MAA (8.5 g), AM (12.6 g), and ST (295.2 g). A monomer emulsion 2 (ME2) was prepared by mixing water (78.3 g), ABS-15 (8.4 g), BA (45.2 g), DC-32 (90.0 g) and MMA (90.2 g).

Comparative (Comp) Ex A

A monomer emulsion 1 (ME1) was prepared by mixing water (182.7 g), SLS (9.4 g), A-189 (0.80 g), BA (219.0 g), MAA (14.9 g), EUEMA (50% active) (7.4 g), and MMA (289.3 g). A monomer emulsion 2 (ME2) was prepared by mixing water (78.3 g), SLS (8.0 g), 2-EHA (99.5 g), A-174 (1.2 g) and MMA (125.1 g).

In a glass reactor, charged with water (420.0 g), SLS (7.0 g), sodium carbonate (2.3 g) and SPS (2.3 g). When the reactor was heated to 87° C., the ME1 was fed into the reactor over 62 minutes. At 82° C., a solution of IAA (0.6 g) in DI water (15.0 g) was fed into the reactor. Ammonia solution was further added to adjust pH value to about 8.0~8.5 and kept stirring for 20 minutes. 4-Hydroxy-TEMPO (0.02 g) was added to the reactor. Then, the ME2 was pumped into the reactor over about 20 minutes, then continue to agitate for around 5 minutes. $FeSO_4 \cdot 7H_2O$ (0.006 g) was mixed with a salt of EDTA (0.03 g) in water (8.0 g) and added into the reactor. A solution of t-BHP (0.60 g) in DI water (10.0 g) and a solution of IAA (0.30 g) in DI water (11.0 g) were further fed into the reactor over 10 minutes. At around 70° C., a solution of t-BHP (0.6 g) in DI water (10.0 g) and a solution of isoascorbic acid (0.35 g) in DI water (11.0 g) were fed into the reactor for 20 minutes. Finally, the obtained dispersion was cooled to room temperature and then filtered with a 44 micron sieve to determine the coagulum content.

Comp Ex B

The aqueous dispersion of Comp Ex B was prepared as in Comp Ex A except the monomer emulsions used were prepared as follows, A monomer emulsion 1 (ME1) was prepared by mixing water (182.7 g), SLS (9.4 g), BA (221.6 g), MAA (15.9 g), AM (2.6 g), and MMA (286.7 g). Monomer emulsion 2 (ME2) was prepared by mixing water (78.3 g), SLS (8.0 g), BA (99.5 g), and MMA (126.3 g).

Comp Ex C

A monomer emulsion 1 (ME1) was prepared by mixing water (208.8 g), SLS (10.7 g), BA (253.3 g), MAA (15.2 g), AM (3.0 g), and MMA (330.6 g). A monomer emulsion 2 (ME2) was prepared by mixing water (52.2 g), SLS (5.3 g), BA (33.2 g), DC-32 (75.0 g), and MMA (42.1 g).

In a glass reactor, charged with water (420.0 g), SLS (7.0 g), sodium carbonate (2.3 g) and SPS (2.6 g). When the reactor was heated to 87° C., the ME1 was fed into the reactor over 72 minutes. Then at 83° C., ammonia solution was added to adjust pH value to about 8.0~8.5 and kept stirring for 5 minutes. At 75-80° C., $FeSO_4 \cdot 7H_2O$ (0.008 g) was mixed with a salt of EDTA (0.04 g) in water (12.0 g) and added into the reactor. Then the ME2 was pumped into the reactor through a homogenizer over about 30 minutes. In the meantime, a solution of t-BHP (0.90 g t-BHP) in DI water (20.0 g) and a solution of IAA (0.55 g) in DI water (21.0 g) were fed into the reactor over 30 minutes and agitated for 10 minutes. At around 70° C., a solution of t-BHP (0.6 g) in DI water (10.0 g) and a solution of IAA (0.3 g) in DI water (11.0 g) were further fed into the reactor for 20 minutes. Finally, the obtained dispersion was cooled to room temperature and then filtered with a 44 micron sieve to determine the coagulum content.

Comp Ex D

A monomer emulsion (ME) was prepared by mixing water (341.0 g), SLS (20.9 g), BA (393.9 g), MAA (19.7 g), AM (40% water solution) (9.8 g), DC-32 (48.8 g), and MMA (511.9 g). In a glass reactor, charged with water (550.0 g), SLS (9.1 g), sodium carbonate (3.0 g), and SPS (2.9 g). When the reactor was heated to 85° C., the ME was fed into the reactor through a homogenizer over 180 minutes in the meantime, a solution of SPS (1.5 g SPS dissolved in 75.0 g water) was fed into the reactor over 180 minutes as well. After the end of feeding of the ME and the SPS solution, the dispersion was kept stirring for 10 minutes. The contents of the reactor were cooled to 70° C., and then $FeSO_4 \cdot 7H_2O$ (0.01 g) mixed with a salt of EDTA (0.03 g) in water (13.0 g) were added into the reactor. At around 70° C., a solution of t-BHP (1.2 g) in DI water (26.0 g) and a solution of IAA (0.7 g) in DI water (27.0 g) were fed into the reactor for 30 minutes. The pH of the dispersion was adjusted to about 8.5 with ammonia. Finally, the obtained dispersion was cooled to room temperature and then filtered with a 44 micron sieve to determine the coagulum content.

Comp Ex E

A monomer emulsion 1 (ME1) was prepared by mixing water (170.0 g), ABS-15 (21.5 g), BA (105.6 g), 2-EHA (105.5 g), MAA (8.5 g), AM (12.6 g), and ST (295.2 g). A monomer emulsion 2 (ME2) was prepared by mixing water (78.3 g), ABS-15 (8.4 g), BA (113.1 g), and MMA (112.7 g).

In a glass reactor, charged with water (490.0 g), ABS-15 (11.3 g), ammonia solution (26%, 1.0 g) and SPS (2.3 g). When the reactor was heated to 87° C., the ME1 was fed into the reactor over 84 minutes. At 82° C., a solution of IAA (0.6 g) in DI water (15.0 g) was fed into the reactor. Ammonia solution was further added to adjust pH value to about 8.0~8.5 and kept stirring for 20 minutes. 4-Hydroxy-TEMPO (0.02 g) was added to the reactor. Then, the ME2 was pumped into the reactor over about 20 minutes, then continue to agitate for around 5 minutes. $FeSO_4 \cdot 7H_2O$ (0.006 g) was mixed with a salt of EDTA (0.03 g) in water (8.0 g) and added into the reactor. A solution of t-BHP (0.90 g) in DI water (10.0 g) and a solution of IAA (0.50 g) in DI water (11.0 g) were further fed into the reactor over 10 minutes. At around 70° C., a solution of t-BHP (0.6 g) in DI water (10.0 g) and a solution of IAA (0.3 g) in DI water (11.0 g) were fed into the reactor for 20 minutes. Finally, the obtained dispersion was cooled to room temperature and then filtered with a 44 micron sieve to determine the coagulum content.

Properties of the above obtained aqueous dispersions are given in Table 1. As shown in Table 1, the aqueous dispersion of Comp Ex D comprising a polymer containing 5% DC-32 as polymeric units was prepared by a conventional one-stage polymerization process, showing a large amount of coagulum (14,608 ppm after filtration with a 44 micron sieve). The aqueous dispersion of Comp Ex C prepared by two-stage polymerization process where the second stage monomer emulsion (ME2) was fed over 30 minutes, in the meanwhile, polymerization of the ME2 occurred at the beginning of the feed. The amount of coagulum formed during polymerization of Comp Ex C (3,834 ppm) was still not acceptable for the industrial manufacture. In contrast, all inventive aqueous dispersions comprising multistage polymers were prepared by at least two stage polymerization, comprising the steps of mixing the ME2 with the first emulsion polymer obtained from the first stage for a period of time (e.g., more than half an hour) to allow at least a part of or almost all of the ME2 to diffuse into the first emulsion polymer particles, and then initiating the polymerization. The inventive multistage polymer dispersions all had a coagulum content of much lower than 2,000 ppm, and were much more stable than the emulsion polymers made by conventional process.

TABLE 1

Compositions and properties of polymer dispersions

| Polymer dispersion | Solids (%) | Particle size[1] (nm) | Coagulum content | Mw (g/mol) |
|---|---|---|---|---|
| Ex 1 | 45.7 | 141 | 436 ppm | 136333 |
| Ex 2 | 47.0 | 115 | 95 ppm | 173875 |
| Ex 3 | 46.9 | 118 | 72 ppm | 172351 |
| Ex 4 | 46.8 | 118 | 125 ppm | 187676 |
| Ex 5 | 45.2 | 112 | 60 ppm | \ |
| Ex 6 | 47.2 | 111 | 244 ppm | \ |
| Ex 7 | 45.9 | 107 | 72 ppm | 208305 |
| Ex 8 | 46.1 | 116 | 91 ppm | 213075 |
| Ex 9 | 46.4 | 107 | 910 ppm | 282035 |
| Ex 10 | 43.36 | 102 | 58 ppm | 456648 |
| Ex 11 | 43.36 | 102 | 116 ppm | 472641 |
| Comp Ex A | 47.6 | 122 | 94 ppm | 128222 |
| Comp Ex B | 46.4 | 141 | 70 ppm | 318098 |
| Comp Ex C | \ | \ | 3834 ppm | \ |
| Comp Ex D | \ | \ | 14608 ppm | \ |
| Comp Ex E | 43.64 | 97 | 116 ppm | 547951 |

[1]Particle size: number average particle size measured by Brookhaven BI-90 Plus Particle Size Analyzer.

Coating Compositions (Coating Exs 1-6 and Comp Coatings A and B)

The above obtained polymer dispersions were used as binders in preparing the coating compositions, based on formulations shown in Tables 2 and 3. All ingredients in the grind stage for preparing each coating composition were added sequentially and mixed evenly for 30 minutes using a high speed disperser at about 1,000 revolutions per minute (rpm) to form a millbase, then followed by the polymer emulsion and other ingredients to give the coating compositions. The obtained coating compositions shown in Tables 2 and 3 were evaluated for gloss retention and water repellency properties, respectively.

As shown in Table 2, paint films made with the inventive multistage polymer emulsions demonstrated improved gloss retention after 2000-hour QUV test, as compared to paint films comprising the comparative polymer dispersions. It indicates that the inventive multistage polymer dispersions can provide exterior paints with better durability than conventional acrylic emulsion polymers.

TABLE 2

| | 18PVC Coating compositions | | | | | |
|---|---|---|---|---|---|---|
| Coating Composition | Comp Coating Ex A | Coating Ex 1 | Coating Ex 2 | Coating Ex 3 | Coating Ex 4 | Coating Ex 5 |
| Grind (g) | | | | | | |
| Water | 23.00 | 23.00 | 23.00 | 23.00 | 23.00 | 23.00 |
| Propylene glycol | 20.00 | 20.00 | 20.00 | 20.00 | 20.00 | 20.00 |
| Kathon LXE | 1.00 | 1.00 | 1.00 | 1.00 | 1.00 | 1.00 |
| TRITON CF-10 | 2.00 | 2.00 | 2.00 | 2.00 | 2.00 | 2.00 |
| Nopco NXZ | 0.50 | 0.50 | 0.50 | 0.50 | 0.50 | 0.50 |
| OROTAN 731A | 6.05 | 6.05 | 6.05 | 6.05 | 6.05 | 6.05 |
| Ti-Pure R-706 | 202.00 | 202.00 | 202.00 | 202.00 | 202.00 | 202.00 |
| Letdown (g) | | | | | | |
| Comp Ex A dispersion | 546.00 | | | | | |
| Ex 1 aqueous dispersion | | 570.00 | | | | |
| Ex 2 aqueous dispersion | | | 553.00 | | | |
| Ex 3 aqueous dispersion | | | | 553.00 | | |
| Ex 4 aqueous dispersion | | | | | 556.00 | |
| Ex 5 aqueous dispersion | | | | | | 562.00 |
| Texanol | 35.00 | 46.80 | 39.00 | 43.00 | 40.30 | 33.80 |
| TRITON X-405 | 2.00 | 2.00 | 2.00 | 2.00 | 2.00 | 2.00 |
| Rocima 363 | 7.00 | 7.00 | 7.00 | 7.00 | 7.00 | 7.00 |
| ACRYSOL RM-2020 NPR | 15.00 | 15.00 | 15.00 | 15.00 | 15.00 | 15.00 |
| ACRYSOL RM-8W | 2.00 | 0.50 | 2.00 | 2.00 | 2.00 | 0.96 |
| Water | 138.45 | 104.15 | 127.45 | 123.45 | 123.15 | 124.69 |
| Total | 1000 | 1000 | 1000 | 1000 | 1000 | 1000 |
| Properties | | | | | | |
| Gloss retention (%) after 2000 hrs QUV | 32 | 40 | 37 | 42 | 39 | 37 |

As shown in Table 3, water repellency properties of 40PVC coating compositions. The paint films comprising the polymer made with 15% DC-32 had good water repellency (beading score: 4), but the paint film comprising the polymer made from pure acrylic monomers without DC-32 did not show any water repellency (beading score: 0).

TABLE 3

| | 40PVC Coating compositions | |
|---|---|---|
| Materials | Comp Coating Ex B | Coating Ex 6 |
| Grind (g) | | |
| Water | 200.0 | 200.0 |
| Natrosol 250 HBR HEC thickener (Ashland) | 4.0 | 4.0 |
| OROTAN CA-2500 hydrophobic acrylic copolymer pigment dispersant (The Dow Chemical Company) | 14.8 | 14.8 |
| AMP-95 | 1.5 | 1.5 |
| TERGITOL ™ 15-S-40 nonionic surfactant from The Dow Chemical Company (TERGITOL is a trademark of The Dow Chemical Company) | 2.0 | 2.0 |
| Nopco NXZ defoamer | 2.0 | 2.0 |
| DB-80 calcined clay (Shanxi Jinyang Company) | 50.0 | 50.0 |
| CC-700 calcium carbonate (Guangdong Jiaoling Company) | 50.0 | 50.0 |
| Ti-Pure R-706 | 200.0 | 200.0 |
| Letdown (g) | | |
| Comp Ex B aqueous dispersion | 360.0 | |

TABLE 3-continued

| 40PVC Coating compositions | | |
|---|---|---|
| Materials | Comp Coating Ex B | Coating Ex 6 |
| Ex 6 aqueous dispersion | | 385.5 |
| Texanol coalescent | 18.5 | 18.5 |
| ROPAQUE Ultra E opaque polymer (The Dow Chemical Compnay) | 40.0 | 40.0 |
| Water | 57.2 | 31.7 |
| Total | 1000.0 | 1000.0 |
| Properties | | |
| Water repellency score | 0 | 4 |

Coating Compositions (Coating Exs 10-11 and Comp Coating E)

The above obtained aqueous dispersions were used as binders in preparing coating compositions, based on formulations shown in Table 4. All ingredients in the grind stage were added sequentially and mixed evenly for 10 minutes to form a base paint at about 1200 rpm. Then ingredients in the letdown stage including the polymer dispersion, water, ammonia, sodium nitrite, and Texanol coalescent were added sequentially into the base paint and mixed at 500-600 rpm. ACRYSOL RM-8W was then added at last to give coating compositions. The obtained coating compositions were evaluated for salt spray resistance properties according to the test methods described above and results are given in Table 4. As shown in Table 4, after 240-hour salt spray exposure, Coating Exs 10 and 11 showed better salt spray resistance with and without scribe as compared to Comp Coating Ex E.

TABLE 4

| Coating compositions and properties | | | | |
|---|---|---|---|---|
| | | Coating Ex 10 | Coating Ex 11 | Comp Coating Ex E |
| Grind (g) | | | | |
| Water | | 42.00 | 42.00 | 42.00 |
| OROTAN 681 | | 7.80 | 7.80 | 7.80 |
| Surfynol TG | | 1.99 | 1.99 | 1.99 |
| Aqueous Ammonia (28%) | | 1.99 | 1.99 | 1.99 |
| Tego Airex 902W | | 0.46 | 0.46 | 0.46 |
| Ti-Pure R-706 | | 209.24 | 209.24 | 209.24 |
| Water | | 42.00 | 42.00 | 42.00 |
| Letdown (g) | | | | |
| Ex 10 aqueous dispersion | | 581.3 | | |
| Ex 11 aqueous dispersion | | | 581.3 | |
| Comp Ex E aqueous dispersion | | | | 581.3 |
| Water | | 59.50 | 57.00 | 53.10 |
| Ammonia (28%) | | 4.00 | 4.00 | 4.00 |
| Sodium nitrite (15%) | | 8.97 | 8.97 | 8.97 |
| Texanol coalescent | | 34.20 | 38.10 | 31.70 |
| ACRYSOL RM-8W | | 1.40 | 1.10 | 1.10 |
| Properties | | | | |
| SSR (blister/rust) | upper area of scribed panel, 240 h | 10/9S | 10/10 | 6F/7P |
| | unscribed panel, 240 h | 6F/9P | 10/10 | 2F/9P |
| Block resistance (area of damaging) | | NA | 3-5% | NA |

What is claimed is:

1. An aqueous dispersion comprising a multistage polymer, wherein the multistage polymer comprises at least a first polymer and a second polymer,
wherein the second polymer comprises structural units of an ethylenically unsaturated siloxane monomer of formula (I), (II), or (III),

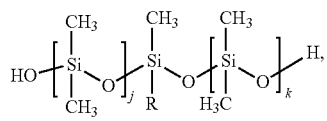
(I)

wherein, in formula (I), R is an ethylenically unsaturated group, and j and k are each independently in the range of from 0 to 100, and j+k=5 to 100;

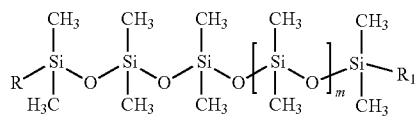
(II)

wherein, in formula (II), R is an ethylenically unsaturated group, $R_1$ is a hydroxyl, alkyl, aryl, alkoxyl, aryloxy, alkyl ether, or aryl ether group, and m is from 1 to 100;

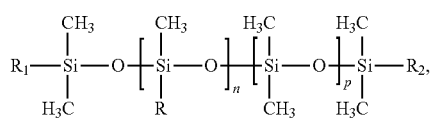
(III)

wherein, in formula (III), R is an ethylenically unsaturated group, $R_1$ and $R_2$ are each independently a hydroxyl, alkyl, aryl, alkoxyl, aryloxy, alkyl ether, or aryl ether group, n is from 1 to 5, and p is from 1 to 100;
wherein the multistage polymer comprises, by weight based on the weight of the multistage polymer, 4.5% or more of structural units of the ethylenically unsaturated siloxane monomer; and
wherein the coagulum content of the aqueous dispersion is less than 2,000 ppm after filtration through a 44 micron sieve.

2. The aqueous dispersion of claim 1, wherein the second polymer comprises, by weight based on the weight of the second polymer, 5% or more of structural units of the ethylenically unsaturated siloxane monomer.

3. The aqueous dispersion of claim 1, wherein the ethylenically unsaturated siloxane monomer has the structure represented by formula (I), wherein R is —CH=CH₂, —$R_p$—OC(=O)CH=CH₂, or —$R_p$—OC(=O)C(CH₃)=CH₂, where $R_p$ is a $C_1$-$C_6$ bivalent hydrocarbon group, and j+k is in the range of from 5 to 50.

4. The aqueous dispersion of claim 1, wherein the multistage polymer has a weight average molecular weight of 50,000 g/mol or more.

5. The aqueous dispersion of claim 1, wherein the weight ratio of the first polymer to the second polymer is from 95:5 to 10:90.

6. The aqueous dispersion of claim 1, wherein the second polymer further comprises structural units of an additional ethylenically unsaturated nonionic monomer, and optionally structural units of an ethylenically unsaturated functional monomer carrying at least one functional group selected from an amide, ureido, carboxyl, carboxylic anhydride, hydroxyl, or sulfonic acid group, a salt thereof, or mixtures thereof.

7. The aqueous dispersion of claim 1, wherein the multistage polymer comprises, by weight based on the weight of the multistage polymer, from 4.8% to 40% of structural units of the ethylenically unsaturated siloxane monomer.

8. The aqueous dispersion of claim 1, wherein the first polymer comprises structural units of an ethylenically unsaturated functional monomer carrying at least one functional group selected from an amide, ureido, carboxyl, carboxylic anhydride, hydroxyl, or sulfonic acid group, a salt thereof, or mixtures thereof; and structural units of an additional ethylenically unsaturated nonionic monomer.

9. The aqueous dispersion of claim 1, wherein the first polymer comprises, by weight based on the weight of the first polymer, less than 5% of structural units of the ethylenically unsaturated siloxane monomer.

10. A process for preparing the aqueous dispersion comprising a multistage polymer of claim 1, comprising:
preparing a first polymer by emulsion polymerization;
dispersing in the first polymer, a second monomer composition comprising an ethylenically unsaturated siloxane monomer, whereby the second monomer composition swells the first polymer, and
polymerizing the second monomer composition within the monomer-swollen first polymer to form a second polymer, thus to obtain the aqueous dispersion with a coagulum content of less than 2,000 ppm after filtration through a 44 micron sieve;
wherein the multistage polymer comprising the first polymer and the second polymer comprises, by weight based on the weight of the multistage polymer, 4.5% or more of structural units of the ethylenically unsaturated siloxane monomer; and
wherein the ethylenically unsaturated siloxane monomer has formula (I), (II), or (III),

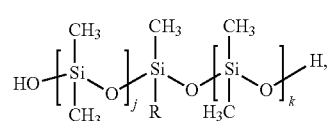
(I)

wherein, in formula (I), R is an ethylenically unsaturated group, and j and k are each independently in the range of from 0 to 100, and j+k=5 to 100;

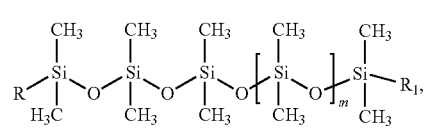
(II)

wherein, in formula (II), R is an ethylenically unsaturated group, $R_1$ is a hydroxyl, alkyl, aryl, alkoxyl, aryloxy, alkyl ether, or aryl ether group, and m is from 1 to 100;

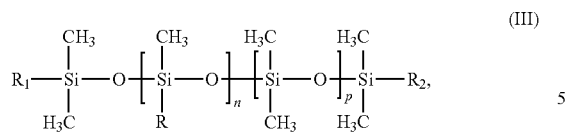
(III)

wherein, in formula (III), R is an ethylenically unsaturated group, $R_1$ and $R_2$ are each independently a hydroxyl, alkyl, aryl, alkoxyl, aryloxy, alkyl ether, or aryl ether group, n is from 1 to 5, and p is from 1 to 100.

11. The process of preparing the aqueous dispersion of claim 10, wherein the second monomer composition is emulsified and homogenized prior to dispersing in the first polymer.

12. An aqueous coating composition comprising the aqueous dispersion of claim 1.

* * * * *